(12) United States Patent
Cizik et al.

(10) Patent No.: US 11,125,487 B2
(45) Date of Patent: Sep. 21, 2021

(54) ETHYLENE ABSORBER UNIT AND HOUSEHOLD REFRIGERATION APPLIANCE HAVING SUCH A UNIT

(71) Applicant: BSH HAUSGERAETE GMBH, Munich (DE)

(72) Inventors: Herbert Cizik, Ottenbach (DE); Maximilian Bauer, Munich (DE); Sebastiaan Magermans, Munich (DE)

(73) Assignee: BSH Hausgeraete GmbH, Munich (DE)

( * ) Notice: Subject to any disclaimer, the term of this patent is extended or adjusted under 35 U.S.C. 154(b) by 175 days.

(21) Appl. No.: 16/542,554

(22) Filed: Aug. 16, 2019

(65) Prior Publication Data
US 2020/0056826 A1   Feb. 20, 2020

(30) Foreign Application Priority Data

Aug. 17, 2018   (DE) .................. 10 2018 213 839.7

(51) Int. Cl.
| | | |
|---|---|---|
| *B01D 53/14* | (2006.01) |
| *B01D 53/72* | (2006.01) |
| *F25D 17/04* | (2006.01) |
| *F25D 23/12* | (2006.01) |
| *F25D 17/06* | (2006.01) |

(52) U.S. Cl.
CPC ........... *F25D 17/042* (2013.01); *B01D 53/14* (2013.01); *B01D 53/72* (2013.01); *F25D 23/12* (2013.01); *F25D 17/065* (2013.01)

(58) Field of Classification Search
CPC ....... B01D 53/14; B01D 53/72; F25D 17/042; F25D 23/00; F25D 23/12
See application file for complete search history.

(56) References Cited

U.S. PATENT DOCUMENTS 8,517,483 B2   8/2013   Eubanks et al.

FOREIGN PATENT DOCUMENTS

JP   2002206851 A   *   7/2002   ............. F25D 23/00

* cited by examiner

*Primary Examiner* — Robert A Hopkins
(74) *Attorney, Agent, or Firm* — Laurence A. Greenberg; Werner H. Stemer; Ralph E. Locher

(57) ABSTRACT

An ethylene absorber unit for a household refrigeration appliance includes a housing and at least one absorber pad which is disposed in a receiving chamber of the housing in such a way that it can be exchanged. A holding duct, which is different from the walls of the housing, is formed in the receiving chamber. The absorber pad is inserted in the holding duct. A household refrigeration appliance having the absorber unit is also provided.

15 Claims, 3 Drawing Sheets

ETHYLENE ABSORBER UNIT AND HOUSEHOLD REFRIGERATION APPLIANCE HAVING SUCH A UNIT

CROSS-REFERENCE TO RELATED APPLICATION

This application claims the priority, under 35 U.S.C. §119, of German Patent Application DE 10 2018 213 839.7, filed Aug. 17, 2018; the prior application is herewith incorporated by reference in its entirety.

BACKGROUND OF THE INVENTION

Field of the Invention

An aspect of the invention relates to an ethylene absorber unit for a household refrigeration appliance, having a housing and an absorber pad which is disposed in a receiving chamber of the housing in such a way that it can be exchanged. A further aspect of the invention relates to a household refrigeration appliance having such an ethylene absorber unit.

A household refrigeration appliance of that type is known, for example, from U.S. Pat. No. 8,517,483 B2. In the embodiment disclosed therein, it is provided that a plurality of absorber pads are received in a receiving chamber or a receiving volume which is delimited by walls of the housing. The absorber pads are formed therein in a cuboid-shaped manner and are supported directly only by the walls of the housing itself. As a result, the insertion and removal of these absorber pads is complex. The absorber pads must be constructed to precisely fit in order that they can be disposed positionally fixed in the receiving volume, which however then entails problems in the insertion and removal. If, however, the absorber pads are configured so as to be significantly smaller, they can be easily removed and inserted, although they are then disposed completely unfixed in the housing. That can lead to undesirable position changes.

Such ethylene absorber units are provided, as is also disclosed in the prior art, in order to absorb ethylene arising during the storage of specific foods in a receiving chamber of the household refrigeration appliance. The ethylene gas is generated, in particular, by fruit and vegetables. Since other foods are sensitive to the ethylene gas, it is desirable to absorb the ethylene gas extensively and in the receiving chamber itself. In that way, an undesirable impairment of other foods can at least be reduced.

SUMMARY OF THE INVENTION

It is accordingly an object of the invention to provide an ethylene absorber unit and a household refrigeration appliance having such a unit, which overcome the hereinafore-mentioned disadvantages of the heretofore-known devices of this general type, which enable an absorber pad to be introduced and removed easily into and from a housing and which furthermore achieve a secure and positionally accurate configuration of an absorber pad in the housing of the unit.

With the foregoing and other objects in view there is provided, in accordance with the invention, an ethylene absorber unit for a household refrigeration appliance. This ethylene absorber unit includes a housing. Furthermore, the ethylene absorber unit includes at least one ethylene absorber pad separate from the housing, which is disposed in a receiving chamber of the housing in such a way that it can be exchanged. This absorber pad is preferably a flexibly and reversibly deformable pad. A holding duct or shaft which is formed in the receiving chamber of the housing is different from the walls of the housing and the absorber pad is inserted into the holding duct. Through the use of such an embodiment, an absorber pad can thus be introduced into the receiving chamber and removed therefrom rapidly and easily while at the same time, by using the holding duct in the receiving chamber, it is also disposed and held positionally secure and thus also precisely placed.

In particular, it is thus no longer the case that the absorber pad is held and supported by the inner sides of the walls of the housing itself. Through the use of the holding duct which is separate from the walls, an absorber pad that is significantly smaller than the receiving volume or receiving chamber can be introduced and nevertheless be lastingly disposed and held exactly positioned therein.

Furthermore, in this way, since the holding unit is configured as a holding duct, the holding unit is again equipped with the absorber pad in a particularly user-friendly manner. The introduction by using the duct or shaft opening is particularly simply and easily enabled so that a targeted introduction of the absorber pad is enabled.

Preferably, a duct or shaft opening of this holding duct faces toward an opening of the housing of the ethylene absorber unit and by using the opening the absorber pad can be introduced into the housing. In this way, a particularly simple insertion process is enabled since the direction of introduction of the absorber pad through the opening of the housing is then also identical to a corresponding direction for the introduction of the absorber pad into the holding duct disposed in the receiving volume of the housing. Complex installation scenarios for the absorber pad can thus be avoided.

It is preferably provided that the holding duct is formed by at least two separate holding tongues which extend upwardly and are formed separately from the walls of the housing. With this construction, the holding duct is formed as a minimal configuration and thus also with the smallest possible duct or shaft walls. In this way, weight can also be saved. Furthermore, by using such a construction, the absorber pad is not introduced extensively into an otherwise closed holding duct, which would possibly impede the absorption effect. Since in practice only very small holding tongues define the shaft in a delimiting manner, the introduction, holding and nevertheless maximum absorption effect is enabled with the absorber pad. After all, the absorber pad then still also lies in the state disposed and held in the duct or shaft as free as possible, and can perform the absorption function extensively.

Furthermore, a certain elasticity and spring effect of these holding tongues is an advantageous consequence of such a configuration. This has the result that the intrinsically reversibly deformable absorber pad can be deformed upon introduction into the holding duct and in this regard, the holding tongues can also have a certain elasticity. In this way, damage to the absorber pad can be prevented. At the same time, due to this elasticity of the holding tongues, however, when the absorber pad is disposed in its end position in the holding duct, a holding force or clamping force of this type is exerted on the absorber pad, so that it is securely held. Although the absorber pad therefore yields under a force application or, as is the case with a pad in the sense to be understood herein, is deformable, such a clamping force is however provided by the holding tongues so that even then the absorber pad can be held securely and exactly positioned.

It is preferably provided that the holding tongues are disposed inwardly offset into the receiving volume toward the inner sides of the walls of the housing. In particular, therefore, the holding tongues are disposed spaced from and without contact with, in particular, the vertical side walls of the housing. An absorption pad is thus disposed and held in the housing spaced from inner sides of the side walls of the housing of the ethylene absorber unit.

It is preferably provided that the holding duct is disposed on a bottom wall of the housing of the ethylene absorber unit and spaced from the side walls of this housing. Through the use of the mounting on the bottom, the holding duct can be configured, with regard to the height configuration in such a way that a relatively high absorber pad can be introduced and in this regard, practically substantially the whole height of the housing can be used. At the same time, by using such an embodiment, the bottom of the housing can also be used as the bottom of the holding duct. In this way, components and weight can be spared.

In particular, the holding tongues are configured in one piece with the bottom wall of the housing and protrude vertically upwardly from this bottom wall.

In an advantageous embodiment, it is provided that at least four separate holding tongues are formed, which are disposed opposing one another in pairs.

In an advantageous embodiment, the housing has a trough-like base body on which a side wall disposed in the height direction of the ethylene absorber unit is pivotably disposed as a side cover. Thus, this side cover can be pivoted open and closed and therefore also represents a laterally pivotable flap. In this way, access to the receiving volume of the housing is particularly easily enabled. In this way also, an insertion and removal of an absorber pad can take place in a particularly simple manner.

It is preferably provided that a side wall of the base body lying opposite the side cover of the base body has holes. In this way, a corresponding exchange of gases between the exterior of the housing and the receiving volume or the receiving chamber of the housing can take place.

In an advantageous embodiment, it is provided that this side cover has a separate usage indicator element with which the usage level of the absorber pad is indicated. Since if the absorber function of an absorber pad falls after a particular usage duration or in particular situations, an exchange of the pad is to take place, such an indication of a usage level or of an absorption function level is very helpful. In this way, a corresponding function level can always be indicated to a user and a user can recognize when an absorber pad is to be replaced.

Preferably, the usage indicator element has an, in particular vertically oriented, in particular linear-shaped, color column with which, depending on the height of the color column, a usage level is displayed visually. Thus, the height of the color column is changed dynamically, dependent upon the usage level of the absorber pad. In this way, the usage level is very easily and intuitively recognizable. Furthermore, this is a very simple embodiment of a usage indicator element since no extensive or complex electronic additions or the like are required.

Preferably, the side cover has a receiving pocket for the usage indicator element. Through the use of such an embodiment, a usage indicator element can be easily removed and exchanged. Since the side cover is pivotably disposed on the base body, for such a removal, for example, of a usage indicator element, the side cover can be pivoted open so that access to the receiving pocket is also enabled unrestrictedly and easily.

It is preferably provided that the receiving pocket has a hinged cover which is pivotably disposed on the inner side of the side cover so that the usage indicator element is introducible between the hinged cover and a wall region of the side cover. In this way, a mechanically simple construction is provided which enables a simple mounting of the usage indicator element and furthermore, also enables a positionally precise mounting of the usage indicator element.

It is preferably provided that a top wall of the housing of the ethylene absorber unit is formed in one piece with the side cover. In this embodiment, the side cover is therefore configured with the top wall and a side wall oriented in the height direction. It therefore has an L-shape in cross-section. Through the use of such a geometrically specified embodiment of the side cover, upon pivoting the side cover relative to the base body, extensive access to the receiving chamber can be achieved. An unrestricted view into the receiving chamber is thus enabled both from the side and also from above. This has advantages for both the insertion and removal of the absorber pad and also accordingly in relation to the advantageously provided usage indicator element.

It is preferably provided that a top wall of the housing of the ethylene absorber unit is formed obliquely downwardly inclined relative to the horizontal. In particular, this applies for a top wall if it is integrated into the side cover. Through the use of such an obliquely inclined configuration of the top wall, in a particularly advantageous manner, it can be enabled that water, for example condensation, which can arise in the receiving chamber of the household refrigeration appliance into which, in particular, the ethylene absorber unit can be inserted, runs down obliquely due to gravity and remains outside the housing of the ethylene absorber unit. An accumulation of the water on the top wall is thereby prevented and thus also a penetration of such condensation into the receiving chamber is preventable.

It is preferably provided that a bottom wall of the housing, in particular a base body of the housing, is obliquely downwardly inclined relative to the horizontal, so that a defined water collecting region is formed in the receiving chamber. Through the use of this oblique position of an inner side of the bottom wall of the housing, the water possibly arising therein, for example a condensate, can be conducted away in a specific manner at a site in the housing which is not occupied by an absorber pad. The absorption of the condensate by the absorber pad can therefore advantageously be prevented.

It can also be provided that the housing has an outlet with which the water collected therein, in particular the water collected in the water collecting region, can be conducted out of the housing in a targeted manner.

A further independent aspect of the invention relating to an ethylene absorber unit is provided in that this ethylene absorber unit has a housing and at least one absorber pad separate therefrom which is disposed in a receiving chamber of the housing in such a way that it can be exchanged. In this embodiment of the ethylene absorber unit, it is provided that the housing has a trough-like base body on which a side wall disposed in the height direction of the ethylene absorber unit is pivotably disposed as a side cover. The side cover has at least one usage indicator element with which the usage level of the absorber pad is indicated, in particular, visually and the side cover has an, in particular closable, receiving pocket for the usage indicator element.

Exemplary embodiments of the aforementioned aspect of the ethylene absorber unit are to be regarded as advantageous embodiments of the further independent aspect of the aforementioned ethylene absorber unit.

With the objects of the invention in view, there is concomitantly provided a household refrigeration appliance having a housing and at least one receiving chamber formed in the housing for food. The household refrigeration appliance has at least one ethylene absorber unit according to one aforementioned aspect or an advantageous embodiment thereof. The ethylene absorber unit is disposed in the receiving chamber. The ethylene absorber unit is configured for the absorption of ethylene gas or ethylene-containing gas. This gas is generated during the storage of fruit or vegetables in the household refrigeration appliance.

The household refrigeration appliance can be a refrigerator or a freezer or a combined refrigerator-freezer. The receiving chamber can be a refrigerator compartment. It can be provided that the household refrigeration appliance has at least two receiving chambers of which one is a refrigerator compartment and another is a freezer compartment. It can also be provided that a receiving chamber is a refrigerator compartment and a sub-region of this receiving chamber has a keep-fresh container. This displaceable keep-fresh container delimits a separate receiving volume for food with a casing and a cover placeable thereon. Storage conditions in the keep-fresh container can be set to be different from the remainder of the receiving chamber. In this way, a particularly individual storage of specific food items is enabled.

The designations "above," "below," "in front," "behind," "horizontal," "vertical," "depth direction," "width direction," "height direction," etc., indicate positions and orientations during proper use and configuration of the unit and/or the device.

Further features and embodiments of the invention are disclosed in the claims, the drawings and the description of the drawings. The features and combinations of features mentioned in the description above and the following features and combinations of features set out in the description of the drawings and/or shown in the drawings alone are usable not only in the respective combination given, but also in other combinations or alone without departing from the scope of the invention. Embodiments of the invention which are not explicitly shown in the figures and described, but which arise and can be created through separate combinations of features from the embodiments described are therefore also to be considered as included and disclosed. Embodiments and combinations of features can also be regarded as disclosed which therefore do not have all of the features of an originally formulated independent claim.

Other features which are considered as characteristic for the invention are set forth in the appended claims.

Although the invention is illustrated and described herein as embodied in an ethylene absorber unit and a household refrigeration appliance having such a unit, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
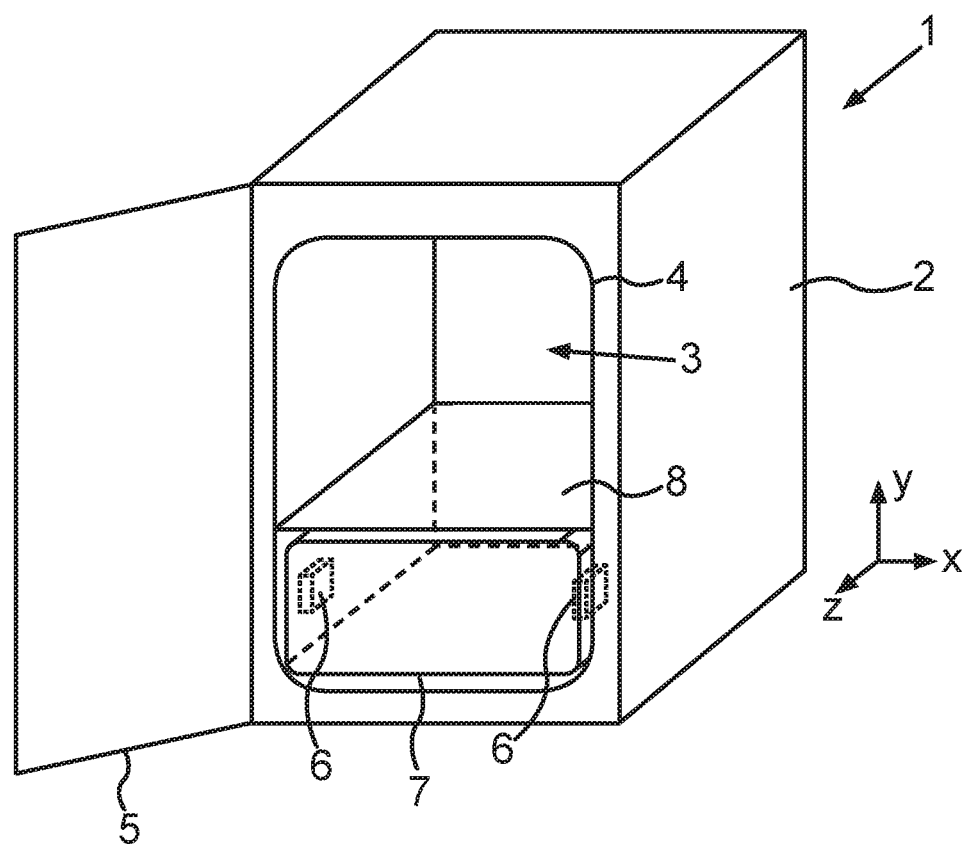
FIG. 1 is a diagrammatic, perspective view of an exemplary embodiment of an inventive household refrigeration appliance with an exemplary embodiment of an inventive ethylene absorber unit.

Referring now in detail to the figures of the drawings, in which the same or functionally identical elements are provided with the same reference characters, and first, particularly, to FIG. 1 thereof, there is seen a diagrammatic representation of a household refrigeration appliance 1 which is configured for storing and conserving food. The household refrigeration appliance 1 can be a refrigerator or a freezer or a combined refrigerator-freezer. In the exemplary embodiment, the household refrigeration appliance 1 has a housing 2. Provided in the housing 2 is at least one receiving chamber 3 for food. The receiving chamber 3 in this case is a refrigerator compartment. The receiving chamber 3 is delimited by walls of an inner container 4 of the household refrigeration appliance 1. The household refrigeration appliance 1 also has a door 5 which is pivotably disposed on the housing 2 and with which the receiving chamber 3 is closable at the front side.

Disposed in the receiving chamber 3 is at least one ethylene absorber unit 6. In this case two ethylene absorber units 6 are provided, but the number and position thereof are to be understood as purely an example. Through the use of an ethylene absorber unit 6, ethylene gas or ethylene-containing gas which can arise in the receiving chamber 3 when food is stored, in particular fruit and vegetables, is absorbed. In this way, it can be prevented that other food is impaired by the ethylene gas being produced.

In the exemplary embodiment shown, it is provided that the household refrigeration appliance 1 has a food receiving container 7 which is formed separately from the walls of the inner container 4. In particular, this food receiving container 7 in this case is a casing which is movably disposed in the receiving chamber 3. In particular, it can be pushed in and pulled out in the depth direction (z-direction).

It is further illustrated therein that a separate shelf 8 is disposed in the receiving chamber 3 so that it is preferably provided in this case that a sub-volume of the receiving chamber 3 in which the food receiving container 7 is disposed is separated accordingly from a remaining receiving volume of the receiving chamber 3.

The food receiving container 7 can also have a cover so that a volume space separated relative to the receiving volume of the container itself is provided. In an embodiment of this type, the food receiving container 7 can then also be a keep-fresh container in which a storage condition distinct from the remaining volume of the receiving chamber 3, in particular a distinct air humidity and/or temperature, can be set. In this way, distinct storage conditions can be created for specific foods.

Figure 2:
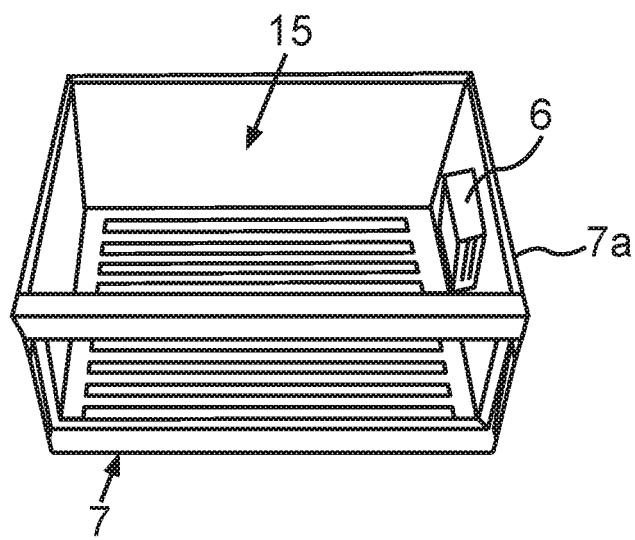
FIG. 2 is a perspective view of a sub-component of the household refrigeration appliance according to FIG. 1 with an ethylene absorber unit disposed therein.

FIG. 2 shows a perspective view of the food receiving container 7. In this exemplary embodiment, it is provided that an ethylene absorber unit 6 is disposed in the interior of this food receiving container 7. In particular, this ethylene absorber unit 6 is disposed on an inner side of a vertical side wall 7*a* of the food receiving container 7.

Figure 3:
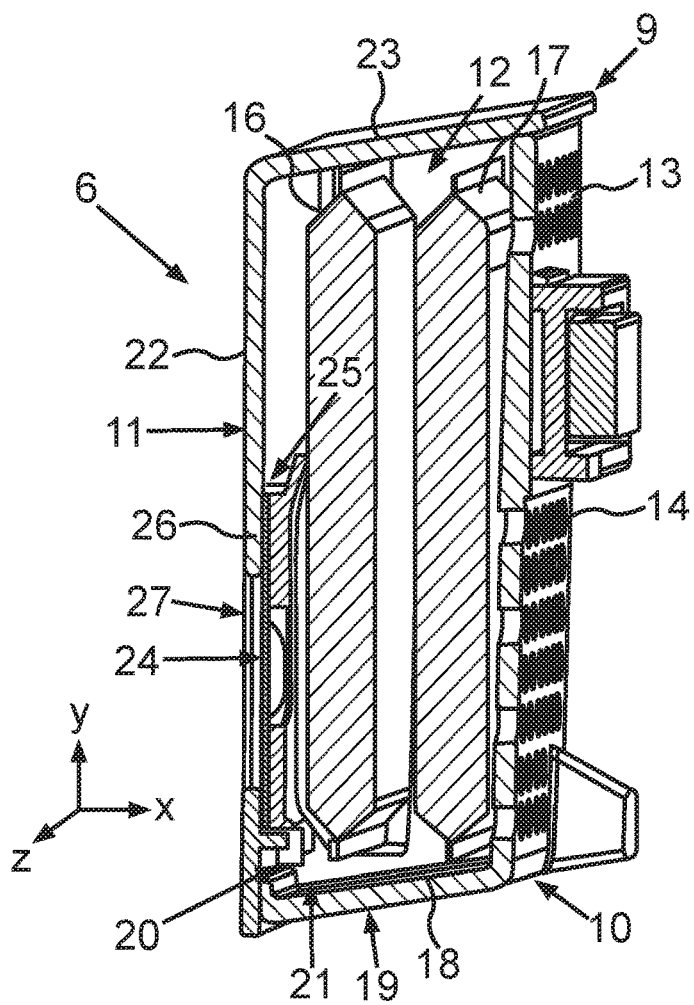
FIG. 3 is a perspective sectional view through an exemplary embodiment of an ethylene absorber unit which can be installed in the embodiment of FIGS. 1 and 2.

FIG. 3 shows, in an enlarged perspective sectional view, a vertical section of the ethylene absorber unit 6. The section plane in this case is the x-y plane and thus the plane that is defined by the height direction and the width direction. The ethylene absorber unit 6 has a housing 9 which includes a base body 10. It is further provided that the housing 9 has a side cover 11 that is separate from the base body 10 and is pivotably disposed on the base body 10. The base body 10 and the side cover 11 delimit a receiving chamber 12 of this housing 9. The base body 10 is configured, in particular, in one piece from plastics. The securing cover 11 is also configured, in particular, in one piece from plastics. As is shown in FIG. 3, the base body 10 has a side wall 13 oriented in the height direction. In particular this side wall 13 has a plurality of perforations, in particular holes 14, so that a corresponding gas exchange between the receiving chamber 12 and the receiving chamber 13 and/or a receiving volume 15 of the food receiving container 7 can take place. In particular, by using these holes 14, ethylene gas can penetrate into the receiving chamber 12 and be absorbed there by at least one ethylene absorber pad 16 and/or 17. In the exemplary embodiment, two absorber pads 16 and 17, which are separate absorber pads, are disposed in the receiving chamber 12. The absorber pads 16 and 17 are also components that are separate from the housing 9.

The base body 10 also has a bottom wall 18. As is shown, an inner side 19 of this bottom wall 18 is obliquely inclined relative to the horizontal. This enables a defined water collecting region 21 to be formed in a corner region 20. Water, for example condensation, arising in the receiving chamber 12 can therefore run in a defined manner into this corner region 20 and, as shown, the two absorber pads 16 and 17 are positionally offset upwardly so that they are disposed without contacting this bottom wall 18. In this way an immersion of these absorber pads 16, 17 in water collected in the water collecting region 21 can be prevented. It can be provided that a defined run-off from the housing 9 is provided so that the water collecting region 21 can then be emptied.

The pivotable side cover 11 in this case has a further side wall 22 oriented in the height direction which is disposed opposite to the side wall 13. This further side wall 22 has no such interruptions or holes 14 for gas exchange. It can be provided in an advantageous embodiment that a top wall 23 of the housing 9 is not formed in one piece with the base body 10, but rather is formed in one piece with the side cover 11. In the sectional representation shown, the side cover 11 has an L-shaped form.

In the exemplary embodiment disclosed, both of the absorber pads 16 and 17 are disposed substantially at the same height and, in the viewing direction, between the side walls 22 and 13 and behind one another.

In an advantageous manner, it is provided that the ethylene absorber unit 6 has at least one usage indicator element 24. Through the use of this usage indicator element 24, the usage level of the absorber pad 16 and/or of the absorber pad 17 is indicated, in particular visually symbolically, with regard to the absorption function. Advantageously, this usage indicator element 24 is disposed in a receiving pocket 25. The receiving pocket 25 in the disclosed exemplary embodiment is formed on the side cover 11, in particular, on the side wall 22. The receiving pocket 25 has a hinged cover 26 which is pivotably disposed on the side wall 22. An accommodating region for the usage indicator element 24 is then formed between the side wall 22 and the hinged cover 26 and is separate therefrom. It is provided in particular that the side wall 22 has a perforation which represents, in particular, a viewing window 27. Through the use of this viewing window 27, the usage indicator element 24 is viewable and the usage level is visually recognizable. Preferably, the usage indicator element 24 has a linear-shaped color column oriented vertically and thus in the height direction (y-direction), with which, depending on the height of the color column 32 (FIG. 5), a usage level is displayed visually. The representation can be similar to a thermometer display.

Figure 4:
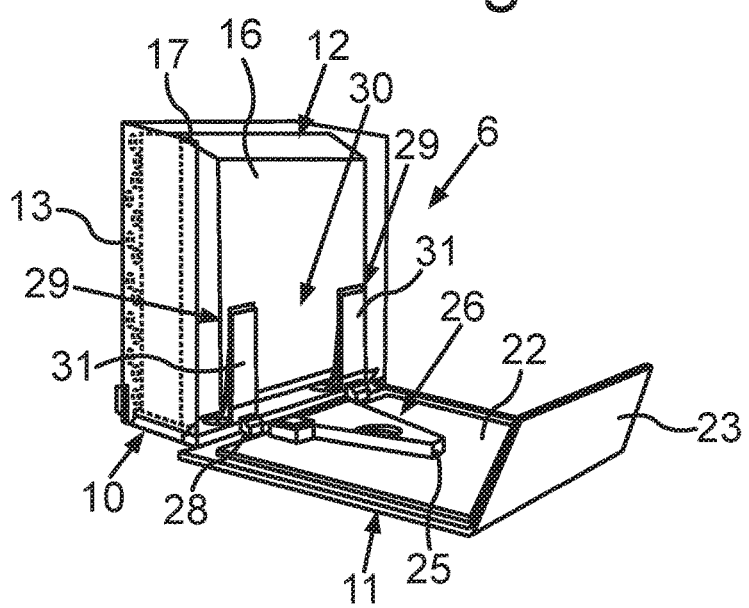
FIG. 4 is a perspective view of the ethylene absorber unit according to FIG. 3 with a side cover opened.

FIG. 4 shows the ethylene absorber unit 6 in a perspective view and with the side cover 11 pivoted out and therefore opened. It is apparent that therefore access to the receiving chamber 12 is enabled simultaneously and unrestrictedly from the side and from above. Access to the absorber pads 16 and 17 is thus possible extensively. FIG. 4 shows a pivot mounting 28 for pivoting the side cover 11 on the base body 10.

A holding duct or shaft 29 is also shown in FIG. 4. The holding duct 29 is formed as integrated into the receiving chamber 12. It is provided for receiving and holding the absorber pads 16 and 17. The holding duct 29 has shaft walls that are separate from the ends of the housing 9 and therefore from the side walls 13, 22 as well as from the bottom wall 18 and the top wall 23. In this way, the absorber pads 16 and 17 are not held and supported by walls of the housing 9, but independently therefrom by this holding duct 29, in particular only by this holding duct 29. In particular, therefore, the absorber pads 16 and 17 are mountable spaced and contact-free from the side walls 13 and 22, in particular also from the bottom wall 18 and the top wall 23.

In the exemplary embodiment shown, the holding duct 29 is formed with an upwardly open shaft opening 30, which faces toward the opening of the base body 10 which, in the closed state of the side cover 11 is sealed by the top wall 23. In the exemplary embodiment shown, shaft walls are formed only by holding tongues 31 which are formed to be standing freely and protruding upwardly in the height direction. In particular, four such holding tongues 31 are provided in order to hold an absorber pad 16 or 17 in a vertical position. An absorber pad 16 is inserted from above into this holding duct 29. Preferably, the further absorber pad 17 that is present in particular is held by a further holding duct.

As can be seen, these holding tongues 31 extend in particular from the bottom of the housing 9 and thus preferably from the bottom wall 18 upwardly. In particular, the holding tongues 31 are integrated into the bottom wall 18 and are therefore formed in one piece therewith. The holding tongues 31 are components separate from the side walls 13 and 22. They advantageously extend over not more than half of the height of the housing 9. It is furthermore shown that the holding tongues 31 are formed to be relatively small or thin so that they cover as small an area of the received and inserted absorber pad 16 as possible. The absorption function of the absorber pad 16 is only minimally impaired thereby.

Figure 5:
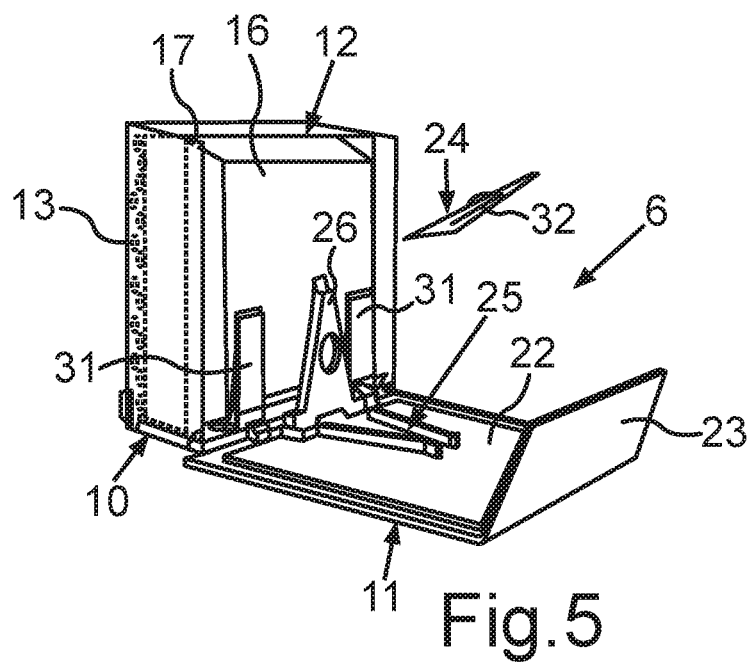
FIG. 5 is a perspective view of the ethylene absorber unit according to FIG. 4 with an additionally opened receiving pocket for a usage indicator element.

FIG. 5 shows the ethylene absorber unit 6 according to the representation in FIG. 4. In distinction therefrom, however, the hinged cover 26 is folded upwardly and thus the receiving pocket 25 is shown in the opened state. The usage indicator element 24 is shown. In this case, the advantageously configured color column 32 is also visible. With this embodiment, access to the receiving pocket 25 and the hinged cover 26 is very easily enabled.

Figure 6:
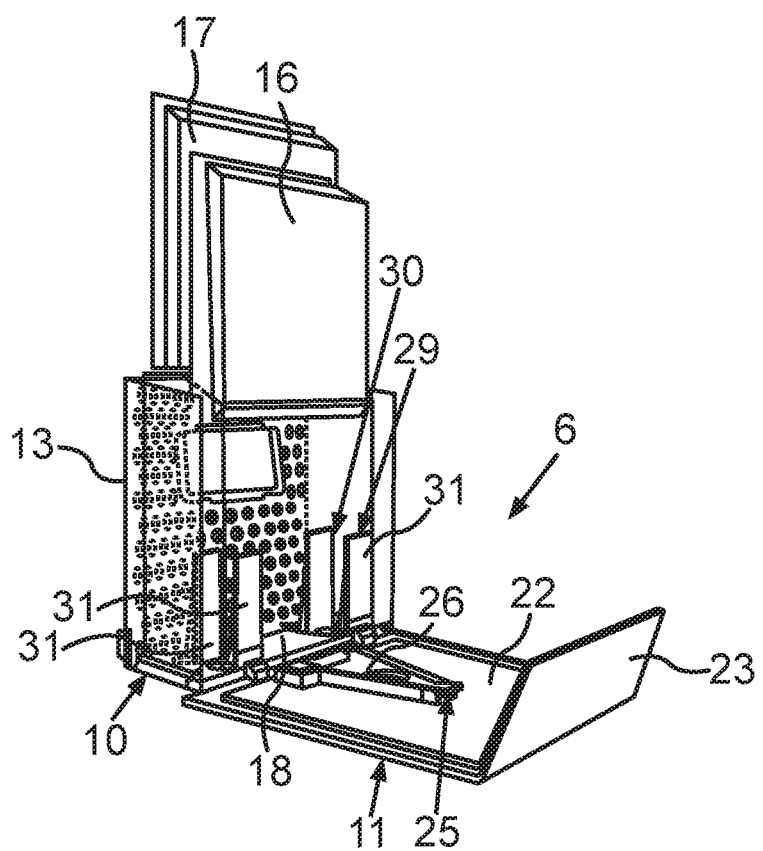
FIG. 6 is a perspective view according to FIG. 4 with the absorber pads removed.

FIG. 6 shows the ethylene absorber unit 6 according to the representation in FIGS. 4 and 5, wherein in this case the absorber pads 16 and 17 are removed and in particular are thus removed from the holding ducts 29. The further holding tongues 31 are also shown herein.

Furthermore, in FIGS. 4-6, the obliquely inclined top wall 23 of the housing 9, in particular the side cover 11, is shown.

The following is a summary list of reference numerals and the corresponding structure used in the above description of the invention:

1 Household refrigeration appliance
2 Housing
3 Receiving chamber
4 Inner container
5 Door
6 Ethylene absorber unit
7 Food receiving container
7a Side wall
8 Shelf
9 Housing
10 Base body
11 Side cover
12 Receiving chamber
13 Side wall
14 Hole
15 Receiving volume
16 Absorber pad
17 Absorber pad
18 Bottom wall
19 Inner side
20 Corner region
21 Water collecting region
22 Side wall
23 Top wall
24 Usage indicator unit
25 Receiving pocket
26 Hinged cover
27 Viewing window
28 Pivot mounting
29 Holding duct
30 Shaft opening
31 Holding tongue
32 Color column
x Width direction
y Height direction
z Depth direction

The invention claimed is:

1. An ethylene absorber unit for a household refrigeration appliance, the ethylene absorber unit comprising:
a housing having walls and a receiving chamber;
said receiving chamber having a holding duct different from said walls of said housing, said holding duct being formed by at least two separate and upwardly extending holding tongues; and
at least one absorber pad inserted in an exchangeable manner in said holding duct of said receiving chamber.

2. The ethylene absorber unit according to claim 1, wherein said housing has a bottom wall, and said holding duct is disposed on said bottom wall of said housing.

3. The ethylene absorber unit according to claim 2, wherein said holding duct is spaced from said side walls of said housing.

4. A household refrigeration appliance, comprising:
a housing;
at least one receiving chamber formed in said housing for accommodating food; and
at least one ethylene absorber unit according to claim 1 being disposed in said receiving chamber.

5. An ethylene absorber unit for a household refrigeration appliance, the ethylene absorber unit comprising:
a housing having walls, a receiving chamber and a trough-shaped base body;
said receiving chamber having a holding duct different from said walls of said housing;
at least one absorber pad inserted in an exchangeable manner in said holding duct of said receiving chamber; and
a side wall pivotably disposed on said base body as a side cover in a height direction of the ethylene absorber unit.

6. The ethylene absorber unit according to claim 5, which further comprises a further side wall of said base body disposed opposite to said side cover, said further side wall having holes formed therein.

7. The ethylene absorber unit according to claim 5, wherein said side cover has a usage indicator element with which a usage level of said absorber pad is indicated.

8. The ethylene absorber unit according to claim 7, wherein said usage indicator element has a vertically oriented, linear-shaped color column with which the usage level of the absorber pad is indicated visually, depending on a height of the color column.

9. The ethylene absorber unit according to claim 5, wherein said side cover has a usage indicator element with which a usage level of said absorber pad is indicated, and said side cover has a receiving pocket for said usage indicator element.

10. The ethylene absorber unit according to claim 9, wherein:
said side cover has an inner side facing said receiving chamber;
said side cover has a wall region; and
said receiving pocket has a hinged cover being pivotably disposed on said inner side of said side cover, permitting said usage indicator element to be introduced between said hinged cover and said wall region of said side cover.

11. The ethylene absorber unit according to claim 5, wherein said housing has a top wall formed in one piece with said side cover.

12. The ethylene absorber unit according to claim 5, wherein said side cover of a top wall formed obliquely downwardly inclined relative to the horizontal.

13. The ethylene absorber unit according to claim 5, wherein said base body of said housing has a bottom wall oriented obliquely downwardly inclined relative to the horizontal to form a water collecting region in said housing.

14. An ethylene absorber unit for a household refrigeration appliance, the ethylene absorber unit comprising:
a housing having a receiving chamber and walls including a top wall formed obliquely downwardly inclined relative to the horizontal;
said receiving chamber having a holding duct different from said walls of said housing; and
at least one absorber pad inserted in an exchangeable manner in said holding duct of said receiving chamber.

15. An ethylene absorber unit for a household refrigeration appliance, the ethylene absorber unit comprising:
- a housing having a receiving chamber and walls including a bottom wall oriented obliquely downwardly inclined relative to the horizontal to form a water collecting region in said housing;
- said receiving chamber having a holding duct different from said walls of said housing; and
- at least one absorber pad inserted in an exchangeable manner in said holding duct of said receiving chamber.

* * * * *